United States Patent
Zaacks et al.

(10) Patent No.: US 7,751,707 B2
(45) Date of Patent: Jul. 6, 2010

(54) METHOD AND SYSTEM FOR CONTROLLING OPTICAL NETWORK

(75) Inventors: Mark Zaacks, Petach-Tikva (IL); Uri Mahlab, Or-Yehuda (IL); Michael Gutin, Petach-Tikva (IL); Tal Muzicant, Misgav M.P. (IL)

(73) Assignee: ECI Telecom Ltd, Petach Tikva (IL)

( * ) Notice: Subject to any disclaimer, the term of this patent is extended or adjusted under 35 U.S.C. 154(b) by 608 days.

(21) Appl. No.: 11/662,488

(22) PCT Filed: Sep. 8, 2005

(86) PCT No.: PCT/IL2005/000949

§ 371 (c)(1),
(2), (4) Date: Mar. 15, 2007

(87) PCT Pub. No.: WO2006/030417

PCT Pub. Date: Mar. 23, 2006

(65) Prior Publication Data

US 2008/0219664 A1   Sep. 11, 2008

(30) Foreign Application Priority Data

Sep. 15, 2004   (IL) ..................................... 164114

(51) Int. Cl.
*H04B 10/08*   (2006.01)

(52) U.S. Cl. ............................ 398/25; 398/66; 398/158
(58) Field of Classification Search .................. 398/25, 398/66, 158
See application file for complete search history.

(56) References Cited

U.S. PATENT DOCUMENTS

| 6,229,631 | B1 * | 5/2001 | Sato et al. ..................... 398/30 |
| 2003/0061017 | A1 | 3/2003 | Dotaro et al. |
| 2007/0014571 | A1 * | 1/2007 | Roberts et al. ................. 398/25 |

FOREIGN PATENT DOCUMENTS

WO   03/003636 A2   1/2003

\* cited by examiner

*Primary Examiner*—Leslie Pascal
(74) *Attorney, Agent, or Firm*—Browdy and Neimark, PLLC

(57) ABSTRACT

A technique is described for controlling and optical network composed of network elements (NEs), with the aid of a network controller (NC) being in communication with the network elements. The technique includes collecting, by the network controller NC, information on the NEs therefrom, and, whenever a change in the network is requested, simulating within the NC operation of the network with the requested change and based on the collected information. The NC makes a decision on acceptability of the requested change, and may then cause implementation of the requested change in the network.

22 Claims, 7 Drawing Sheets

METHOD AND SYSTEM FOR CONTROLLING OPTICAL NETWORK

FIELD OF THE INVENTION

The present invention relates to a technique for monitoring and controlling operation of an optical network.

BACKGROUND OF THE INVENTION

Monitoring and control of optical networks with the aid of calculations and further testing the networks' operation is a concept that has been generally considered in the prior art.

US 2003/0058494A (WO03/003636A2) describes an optical network system having a global controller capable of monitoring and controlling all elements of the network. The controller receives performance data from each optical network element and calculates a performance value for each channel transmitting through the system. The controller then isolates the channel with the minimum performance value and tests possible variations in network element parameters to determine a measure, which would increase the performance value. Once such a change is found, it is implemented and the system is re-optimized.

The controller of US 2003/0058494A is called a global controller capable of controlling all the elements of the network. The controller receives performance data from each optical network element, and calculates a performance value for each channel transmitting through the system. The controller then isolates the channel with the minimal performance value and tests possible changes in network element parameters to find a change which would increase this performance value. Once such a change is found, it is implemented and the system is re-optimized. It should be noted that, for testing the possible changes in the above-described system and making a decision, the elements and optical channels are to be physically subjected to possible changes. Needless to say that operations of the real testing always affect transmission of traffic via the network.

SUMMARY OF THE INVENTION

It is an object of the present invention to provide a method (and a suitable system) for controlling an optical network, which would facilitate making decisions in the network controller and allow performing the control functions in a traffic non-affective manner.

According to a first aspect of the invention, there is proposed a method for controlling an optical network composed of network elements (NEs), with the aid of a network controller (NC) being in communication with said network elements, the method includes collecting, by the network controller NC, information on the network elements from said NEs, whenever any change in the network is requested, simulating, within the network controller, operation of the network with the requested change based on the collected information on the network elements, making, in the network controller, a decision on acceptability of the requested changes, and, if the decision is positive, causing implementation of the requested changes in the network.

Preferably, the method comprises informing a Network Management System (NMS) by said Network Controller about the decision made in respect of the requested change and, if the decision is positive, implementing the required change with the aid of the NMS.

If the decision is negative, the method preferably comprises a step of producing, by said NC, recommendations alternative to the required changes.

The method preferably comprises:

preliminarily providing each particular network element (NE) with an individual ID tag comprising a memory storing information on individual parameters of said particular NE, providing said ID tag with a capability of communicating with said NC and informing said NC about the individual parameters of the NE;

providing the NC with a capability of communicating with the ID tags of said NEs.

Communication between the ID tags and the network controller NC can be organized in a variety of ways, for example by using optical supervisory channels or other signaling means utilized for management, by using wireless technology, etc.

The information on a particular network element NE comprises individual parameters thereof including static parameters and dynamic parameters;

the static parameters comprise individual physical parameters of said particular network element, and may also comprise constant physical parameters characteristic for the type of said particular NE;

the dynamic parameters of a particular NE comprise at least changeable working conditions of the particular NE.

The dynamic parameters (variables) are preferably calculated, but can also be measured, alternatively or in addition to the calculated values. For example, such dynamic parameters as output values of power of various optical channels at a particular element can be calculated and further stored in the ID tag, while these power values may also be measured by monitoring circuits of the network element. The measured values can be used either instead the calculated values, or in order to compare the calculated values with the measured ones. Results of the comparison may possibly initiate alarms to the network controller NC.

According to a preferred version of the method, the step of simulating operation of the network comprises simulating operation of one or more network links forming the network. Typically, the link is a WDM (Wavelength Division Multiplexing) optical link.

According to a second aspect of the invention, there is provided a network controller (NC) for managing an optical network comprising a number of network elements (NEs), the controller being capable of communicating with the network elements for collecting information there-from;

said network controller NC being associated with and operative to initiate a network simulator (NS), while the NS being capable of simulating operation of said network based on the collected information and data on any desired change in the network, said network controller NC being also adapted, based on the simulation results, to make a decision whether the desired change is acceptable, and to cause implementation of said change if the decision is positive.

Preferably, the NC is capable of communicating with a Network Management System (NMS) in response to the decision.

Further preferably, the network controller NC is capable of:

causing said NMS to implement the desired change if said decision is positive; and producing and forwarding to said NMS recommendations alternative to the desired changes, if said decision is negative.

The information on the network elements preferably comprises individual parameters of respective NEs, which include static parameters and dynamic parameters. The static parameters of a particular NE may comprise constant physical parameters characteristic for the type of said particular NE and, preferably, constant individual physical parameters of said particular network element. The dynamic parameters of a particular NE comprise at least changeable working conditions of the particular NE, which can be measured and/or calculated based on other measurements and said static parameters.

Preferably, the network simulator NS can be a software/hardware unit designed to reflect the optical network behavior by means of a mathematical simulation thereof taking into account the static and dynamic parameters of the network elements NE, as well as parameters of optical fiber spans connecting said NE. The NS block is intended for predicting consequences of any desired change(s) in the network; information on such consequences serves a basis for said decision.

The network controller, upon checking consequences of the simulated change(s), may decide whether to introduce in the network real changes which have been simulated. Usually, predetermined criteria of stability/operability of the optical network are used for such a decision.

However (and preferably), the simulation block NS may be adapted itself to make decisions on acceptability of the desired changes, based on the predicted consequences and the predetermined criteria of stability/operability of the optical network.

It should be noted that the network simulator NS may also comprise and preferably comprises a memory block for storing a database required for performing the simulation. For example, the information, which should be known to the simulator block, comprises the number of optical channels (NOC) currently active at each particular network section. This information can be received either from the Network Management System and stored in the memory of the simulator block, or received from at least one of the network elements positioned at the end of the network section. Usually, the memory block of the NS stores parameters of optical fibers spanning the network elements NE of the network. Optionally, it may also hold databases of constant parameters of the network elements NE.

Preferably, the network controller (NC) is an integral part of the Network Management System (NMS).

According to a third aspect of the invention, there is provided a Network Management System comprising the above-described network controller (NC) with the network simulator (NS).

According to a fourth aspect of the invention, there is provided a network element NE equipped with an individual ID tag comprising:
  a memory block for storing individual parameters of the network element,
  an interface block capable of communicating with a network controller (NC) and transmitting to it at least one of the individual parameters stored in the memory block.

The individual parameters are preferably entered in the ID tag by the manufacturer. However, they can be determined and entered by a user before installation of the NE in the network.

The individual parameters stored in the memory block preferably comprise one or more static parameters and one or more dynamic parameters of said NE.

Preferably, the ID tag also comprises a processor for processing the parameters (said measured dynamic parameters and/or said static parameters) for further storing thereof in the memory block.

Optionally, the network element also comprises one or more measuring (monitoring) circuits for measuring at least one of said dynamic parameters. The measuring (monitoring) circuits may in principle be capable of performing specific calculations based on the measurements of the dynamic parameters. However, the calculations are preferably performed in the inner processor of the ID tag.

Further preferably, the memory of the ID Tag comprises an industrially manufactured read only memory ROM for storing all static parameters of the network element and a random access memory RAM for storing the dynamic parameters of the network element.

The static parameters, in addition to individual constant parameters of the specific NE, may also comprise constant parameters characteristic to the type of said NE, and quasi-static parameters that can be processed and updated according to any predetermined function.

The static parameters may comprise such parameters as: physical parameters characteristic for a particular type and model to which the NE belongs (usually, such parameters are known and can be provided by the manufacturer), individual physical parameters of the NE (can be individually clarified and also provided by the manufacturer). They are usually stored in the ROM. Updatable static parameters which may change with temperature, be subjected to aging, environmental conditions, etc. (also called quasi-static parameters) can also be stored in ROM, together with functions allowing processing and updating these parameters.

The RAM preferably stores dynamic parameters of the NE, which usually change with time and thus are updated from time to time or even in real time. Examples of such parameters are real time working conditions of the NE (input and output power values, their ratios, for example Pin/Pout at a particular wavelength, OSNR, Temperature, Dispersion, etc.

According to a fifth aspect of the invention, an optical network is provided comprising a number of network elements NE controllable with the aid of a network controller NC,
  each of the NE being provided with an individual ID tag capable of communicating with said NC and comprising a memory block for storing individual parameters of the network element NE;
  the NC being capable of communicating with said NE for collecting there-from information stored in their respective ID tags, and being provided with a Network Simulator capable of simulating operation of the network using said information.

According to yet a further aspect of the present invention, there is provided a software product comprising software implementable instructions and data suitable for carrying out the method described above.

Consequently, a carrier media is provided comprising the software product and suitable to be incorporated in, and used in conjunction with the network controller NC (or the like) of the optical network.

BRIEF DESCRIPTION OF THE DRAWINGS

The invention will further be described with reference to the following non-limiting drawings in which.

DETAILED DESCRIPTION OF THE PREFERRED EMBODIMENTS

Figure 1:
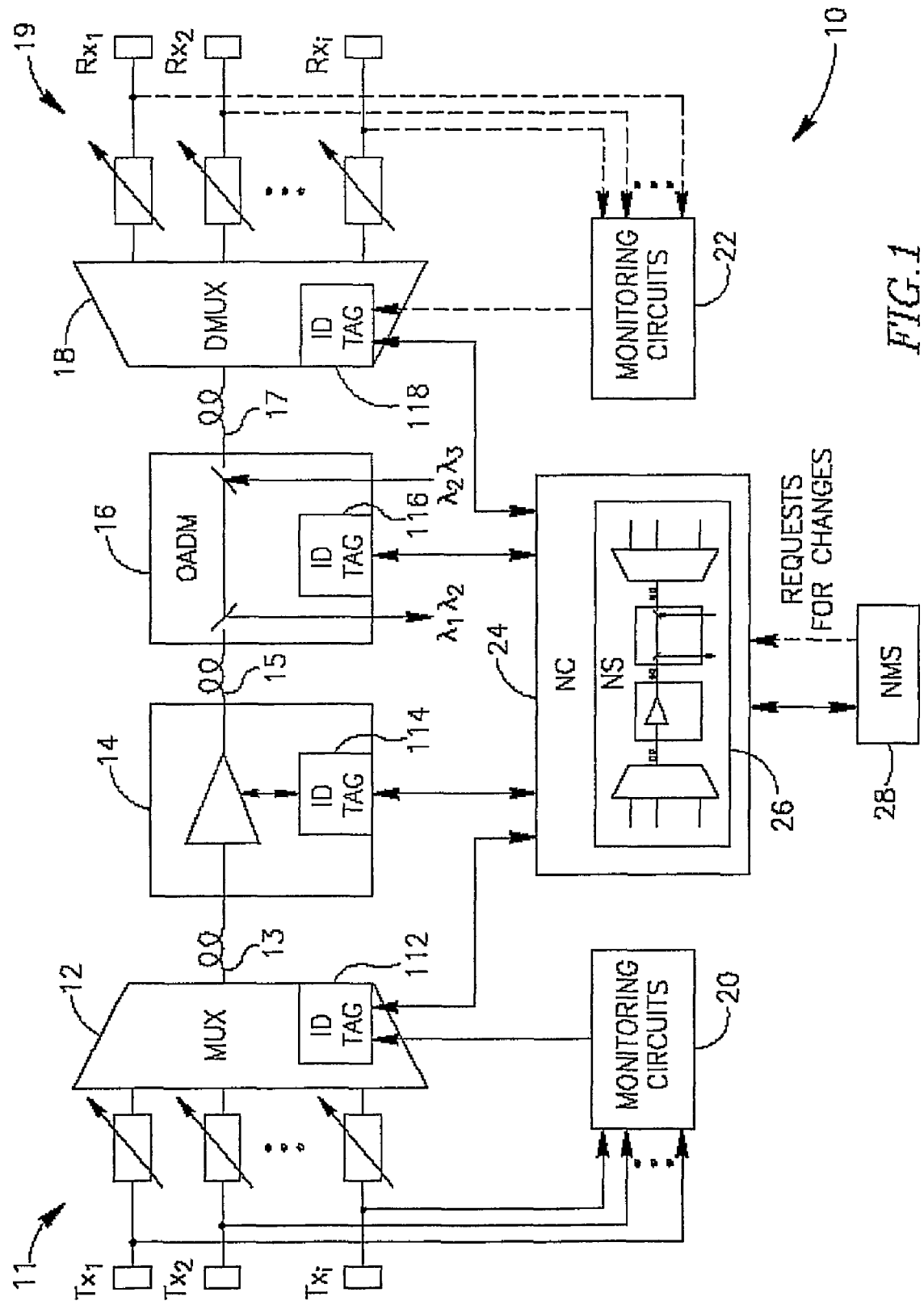
FIG. 1 is a block diagram schematically illustrating the principle of the proposed technology of managing an optical network.

FIG. 1 illustrates a simplified block diagram of an optical network 10 in the form of an optical link comprising the following optical network elements: a Multiplexer (MUX) 12, an amplifier 14, an Optical Add Drop Multiplexer (OADM) 16, a Demultiplexer (DMUX) 18. Every network element is provided with an Identifying Tag (ID Tag) with internal memory storing individual parameters of the network element, and with an interface capable of communicating with a network controller (NC) 24. The ID tag is preferably provided with an internal processor (not shown in this drawing).

It should be noted that the invention relates to various types of optical networks which can be represented as various combinations of optical links. The elements are connected by fiber spans, some of them are shown in the drawing: 13, 15, 17. Optical channels incoming the network 10 are generally marked 11 and start from transmitters Tx1-Txi. The outgoing channels are generally marked 19 and terminate at receivers Rx1-Rxi. Activity and parameters of the incoming channels are monitored and can be altered by means of variable optical attenuators positioned at each of the channels and controlled by NMS 28.

Monitoring of the incoming channels 11 is performed by a monitoring (measuring) circuit 20. The outgoing channels can also be monitored—by a monitoring circuit 22, but this operation is optional and can be used, for example, for comparing the simulated results with real results upon implementation of a preliminarily simulated change. Monitoring circuits may optionally exist also at other elements of the network, though are not shown in the drawing. For example, a monitoring circuit of the amplifier 14 can be adapted to monitor the fiber spans 13, 15 where all the channels are combined. Monitoring circuits of the MUX 12 and DMUX 18 may measure working conditions such as input or output power at each of the channels, OSNR, and may then forward information about the measured working conditions to respective ID Tags: 112 and 118, to be stored in their inner memory. However, these parameters can be obtained by simulating the link, as will be explained below. As shown in the drawing, ID Tags of the network elements 112 and 118 are able to forward information stored in their memory to the Network Controller NC 24. The Controller 24 is adapted to maintain such a communication with ID Tags of all network elements of the network 10. The communication technology between the ID tags and NC 24 can be wired/optical or wireless. Typically, each ID Tag is a chip comprising a ROM for storing static (mostly constant) individual parameters of the network element in which it is incorporated, and a RAM for storing and updating dynamic parameters of the element. Each ID Tag, in addition to the communication interface for communicating with the NC, may also comprise an interface for interacting with a suitable monitoring circuit of the network element. Alternatively and preferably, dynamic working parameters of the network element are calculated based on the static parameters of the element and other dynamic parameters. These calculations can be performed in the ID tag by means of its internal processor, or in the NC.

The static parameters are typically entered in the memory of the ID Tag by the Manufacturer. Preferably, the static parameters comprise not only general parameters known for this kind and group of equipment, but the exact individual constant parameters clarified at the manufacturers plant for that particular network element. Classic examples of the individual static parameters are gain G and Noise Figure NF, measured for different specific wavelengths and written down in the ID tag. Usually, the static parameters also include physical constants, constant parameters known for this type of network elements, and also quasi-static parameters which can be updated depending on temperature, time, etc. using predetermined functions. Such functions can be stored in the ID tag memory in various forms, for example in the form of tables.

The dynamic parameters include updatable physical parameters which change with time or the environmental situation, usually the dynamic parameters are working conditions of the NE. Some working conditions (input power) can be determined by a monitoring circuit incorporated in the same assembly of the network element, or calculated in a chain. Other dynamic parameters, such as OSNR can be obtained from physical measurements. Still further dynamic parameters (such as BER, output power) can be calculated from other dynamic parameters (say, BER can be calculated based on OSNR; output power of an amplifier can be calculated based on its input power and gain). As has been mentioned, the ID Tag preferably comprises its inner local processor for updating some static parameters and for obtaining some dynamic parameters from static parameters and/or other dynamic parameters.

As mentioned above, the ID Tag 114 communicates with the Network Controller 24 and thus all the information about the amplifier 14 becomes known to the Network Controller 24 and can be stored in its database (not shown). Similarly, information about any other NE of the network is collected at the NC. At least, information on static parameters of the network elements, and information on optical fibers' parameters can be once stored in the database of NC 24 to facilitate further communication and processing.

Whenever any changes are planned in the network (e.g., adding or removing optical channels to increase/decrease the network load, procedures of wavelength allocation, etc.), and are received as requests for desired changes at the Network Controller 24—preferably from a Network Management System 28—the Network Controller NC 24 activates its associated Network Simulator (NS) 26 in order to model the new situation and estimate consequences of the desired changes. The Network Simulator (NS) is a software program that mathematically reflects the network 10. It should be noted, that the database of the NC 24 actually constitutes a database of the NS 26.

Results of a specific performed simulation can be analyzed in the NS 26 being part of NC 24, by using predetermined criteria of the network stability that are also stored in the database.

Based on the analysis, the NC 24 makes a decision whether the planned changes can be implemented, and informs the Network Management System (NMS) 28 about it, so that the NMS may either apply the acceptable changes to the network 10 via management channels (not shown), or issue alternative recommendations to modify the previous request for changes.

Figure 2:
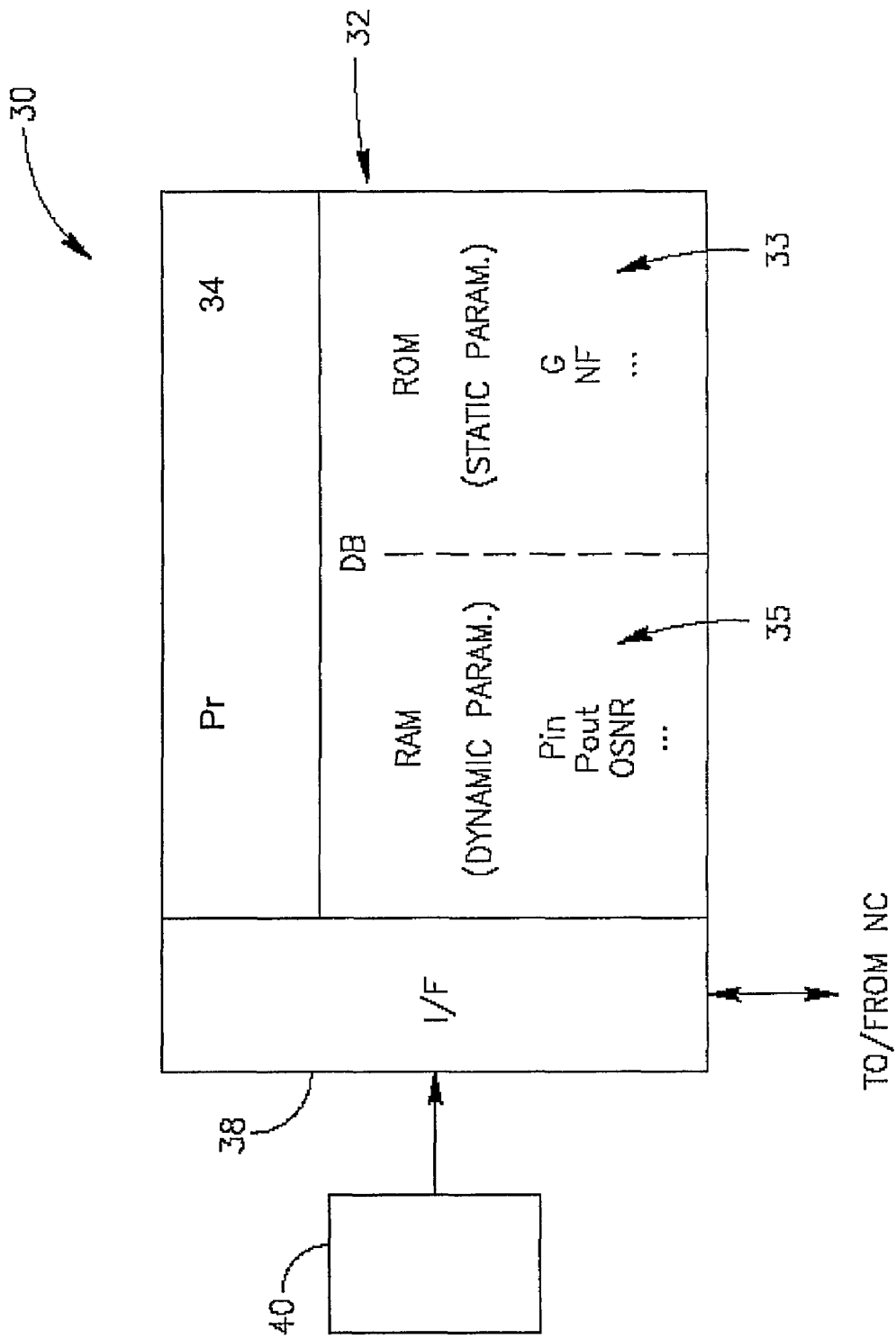
FIG. 2 schematically illustrates a block diagram of a so-called network element ID tag, comprising a database for storing static parameters and dynamic parameters of the network element.

FIG. 2 illustrates an exemplary block diagram 30 of an ID Tag of a particular network element NE. In this embodiment, the ID Tag comprises a memory Database 32, a Processor 34 and an interface block 38. The ID Tag communicates with the Network Controller (not shown) via the interface block 38. Optionally, the ID tag may also communicate with monitoring circuits 40 of the network element. The memory Database 32 is schematically divided into a first memory block 33 (ROM) keeping static or constant parameters of the NE, and a second memory block (RAM) 35 keeping dynamic parameters measured by the monitoring circuits block and/or calculated by the processor 34. The static individual parameters of the NE can either be determined and entered by the manufacturer in advance, or stored upon being determined by the user/calculated by the processor 36 based on the static parameters of the type to which the NE belongs. Let us suppose that the network element to which the ID tag 30 belongs is an optical amplifier. In the figure, the database stores such static parameters as amplifier's gain G and Noise Figure NF (for each optical channel), and such dynamic parameters as input power (Pin), output power (Pout), Optical Signal to Noise Ratio (OSNR) and others for each optical channel.

Figure 3:
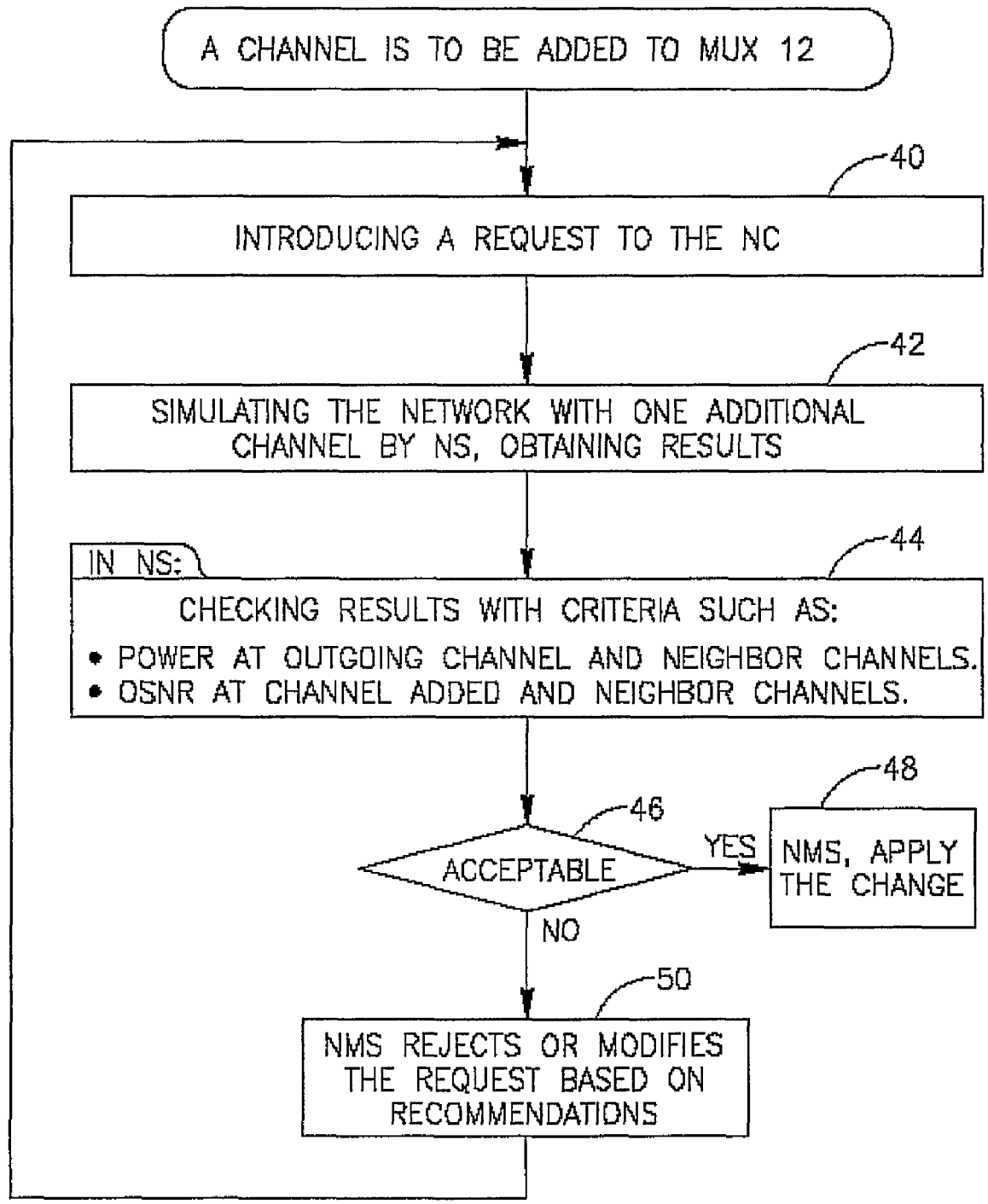
FIG. 3 schematically illustrates an exemplary flow chart of introducing some desired changes in the optical network with the aid of the newly proposed network controller.

FIG. 3 shows one basic algorithm of managing an optical network by using the network simulator, when one optical channel is to be added to the network.

Suppose, an optical channel is to be added to the network and a request is introduced by NMS to a Network Controller NC (box 40).

The following macro step is simulating operation of a network modified according to the request, by the Network Simulator NS (box 42).

The next macro step is analyzing results of the simulation by the NS (box 44). In order to examine the results, a number of criteria should be checked by simulation, for example:

Checking the power balance (i.e., whether it is between the maximum and the minimum allowed power) at the destination point of the channel (in this case, at a new channel among the outgoing channels 19, or among the channels dropped from the OADM 16, whichever applies);

Checking the power balance at other channels (at least at the neighboring channels);

Checking OSNR and BER at the added channel and the neighboring channels (at the destination points), from the point of a predetermined acceptable maximum value;

If the acceptable ranges are not exceeded (box 46), the NMS is informed and the request is implemented (box 48). In the opposite case, the request is either dropped or modified by NMS (box 50), using recommendations which can be provided by the NS. The recommendations, for example, may concern changing the transmission bit rate in at least some of the newly examined channels, performing pre-emphasis in at least some of the newly examined channels, etc.

Figure 4:
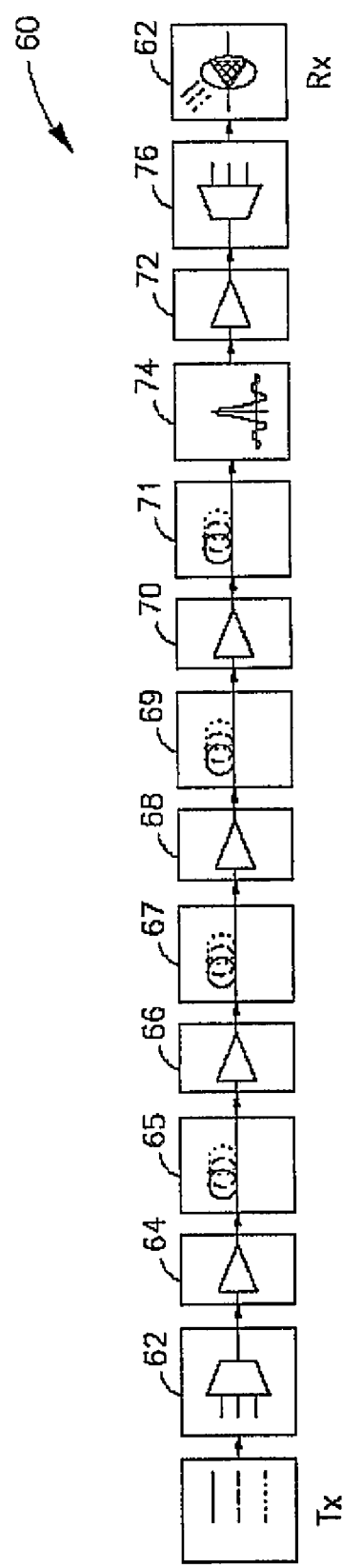
FIG. 4 schematically illustrates an exemplary optical link to be simulated and controlled according to the proposed technology.

FIG. 4 shows an optical link 60 comprising an optical multiplexer (MUX) 62 which is suitable for multiplexing 40 optical channels from suitable transmitters, five optical amplifiers 64, 66, 68, 70 and 72 of different types, a dispersion compensation module (passive module DCF) 74 and an optical demultiplexer (DMUX) 76 connected to a receiver module. The elements are all connected in a chain by regular optical fiber spans 65, 67, 69 and 71. Each of the network elements is provided with its ID tag storing individual parameters of the element, at least its static individual parameters. For example, the MUX 62 has internal attenuation 18 dB, the amplifiers 64, 70 and 73 have equal gains of 23 dB, the amplifier 66 has gain 29 dB, the DMUX has internal attenuation 6 dB. The dispersion compensation module 74 is capable of compensating dispersion of 80 km of a regular fiber. Data on fiber spans 65, 67, 69, 71 (the length of fiber, type of the fiber, attenuation value per 1 km of the fiber) is stored in the network controller NC database. For example, the fiber span 65 is of a regular optical fiber, its length is 94 km and its attenuation is 20 dB.

Let us suppose that presently, the optical link 60 transmits only one optical channel and its characteristics satisfy the required criteria, for example the main criteria of the output power (Pout) at the specific wavelength of the channel and the optical signal to noise ratio at the output (OSNR out) at the same specific wavelength. Let us further suppose that according to a new request of the user, the link is required to convey data over all the possible 40 optical channels.

Theoretically, the optical link 60 could be simulated using the data on typical parameters, which is usually provided by manufacturers for the network elements of specific types. Any typical parameter of a particular element is often presented as a range of values in which range the real value of the parameter must be found.

Disadvantages of a regular simulation or calculation which uses the typical parameters are therefore clear: the regular simulation is unable to take into account properties of the specific installed elements and thus of the system, but only of typical elements and a typical system. Results of such a simulation are as follows:

1. The real system performance can differ significantly from the calculated one
2. Satisfactory provisioning of the system can not be done
3. Replacement of any network element may cause unpredictable changes in the system's balance.
4. The optical link 60 shown in FIG. 4 was simulated using the proposed technology of providing individual ID tags to each network element and utilizing the individual parameters of the network elements in the simulation.
5. As has been noticed above, the main criteria for estimating balance of the optical link are the following two parameters: Output power at the given wavelength (Pout) and OSNR at the given wavelength.
6. Both the OSNR and Pout can be calculated (simulated) before applying any changes to the link. It can be performed by chain, using the following known equations. For every amplifier the power and OSNR per channel is given by:

$$P_{out}(\lambda) = 10\log[P_{in}(\lambda) \cdot \text{Gain}(\lambda)]$$

$$OSNR_{out}(\lambda) = 10\log\left[\frac{P_{in}(\lambda)}{\frac{P_{in}(\lambda)}{OSNR_{in}(\lambda)} + h\nu\Delta\nu NF(\lambda)}\right]$$

where λ is a wavelength, P is the power, h is Planck's constant, ν is the frequency, Δν is the noise bandwidth and NF is the amplifier noise figure. In the equations:

and OSNR are the variables (dynamic parameters) which can be either measured or calculated. In this example, they are calculated, in a chain, in the network simulator.

NF and G are the individual constant written parameters (static parameters) which are entered in the memory of ID tags of the amplifiers used in the link 60.

Figure 5A:
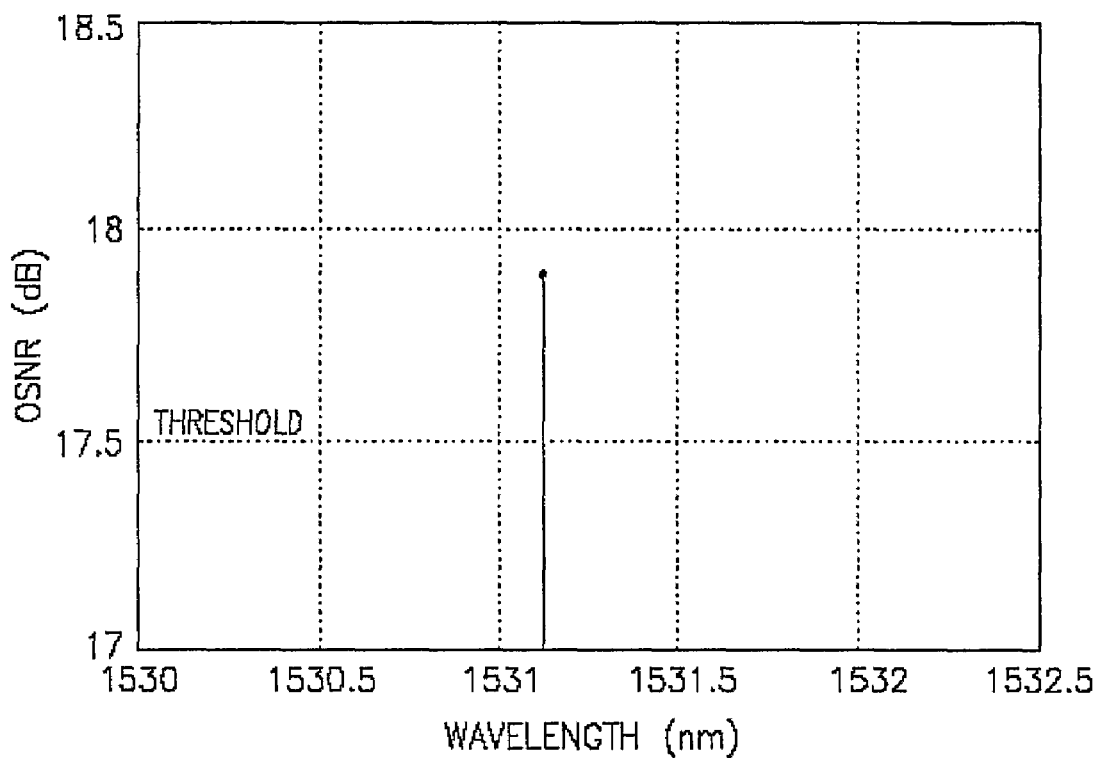
FIGS. 5a, 5b schematically illustrate results of the proposed simulation of the optical link shown in FIG. 4, for a case of carrying a single data channel and for a case of full load (e.g., 40 data channels).
Figure 5B:
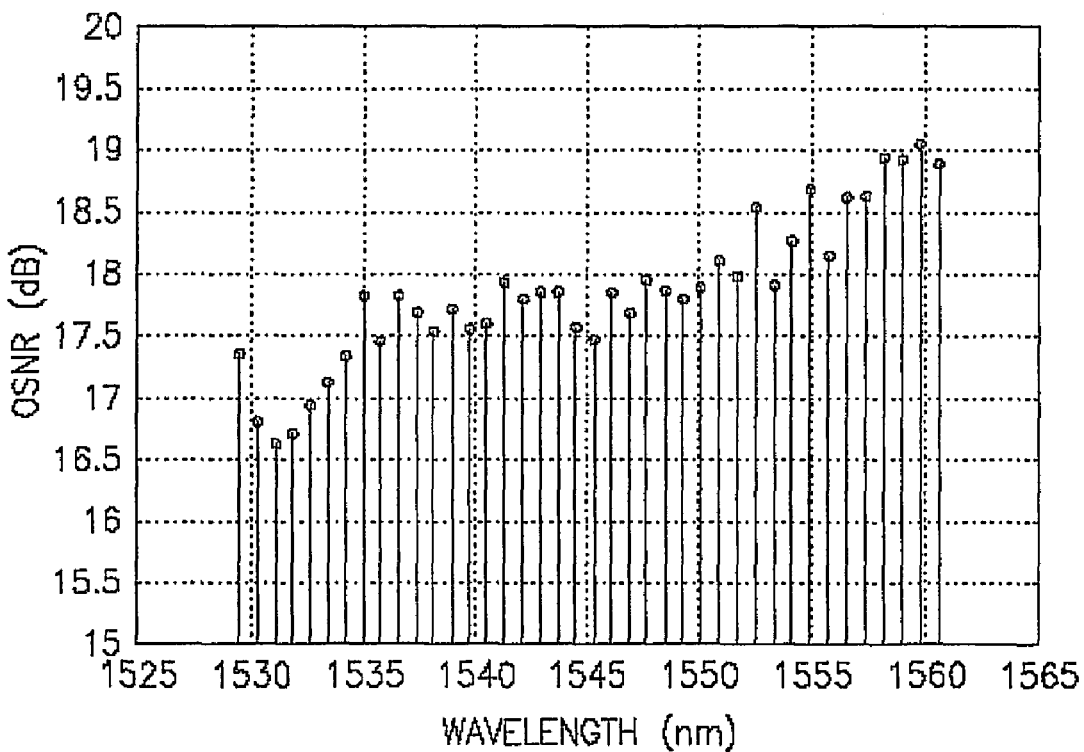

FIGS. 5a and 5c illustrate the simulated OSNR for the link's 60 output with one channel (FIG. 5a) and in full capacity of 40 channels (FIG. 5b). The channels are demonstrated by their simulated OSNR values at their particular wavelengths, each of the values being situated either above or below the minimal threshold value being in this case 17.5 dB. As one can see the simulation determined a strong degradation as the system was theoretically upgraded from one active channel to 40. The proposed method enables an operator to predict similar situations for every specific installed network and to obtain recommendations from the management system (or from the simulator) to prevent the traffic degradation resulting from the requested upgrade process. There are several possible recommendations, which the simulator (and the NMS) may issue in similar situations:

1. Performing pre-emphasis (power balancing) of some of existing channels or some of the channels to be added before the upgrade.
2. Limiting the number of new added channels,
3. Changing the spectrum allocation of the channels,
4. Bit rate management of the new/existing channels (channels that are predicted to have problems can be used at lower bit rates).

Figure 6:
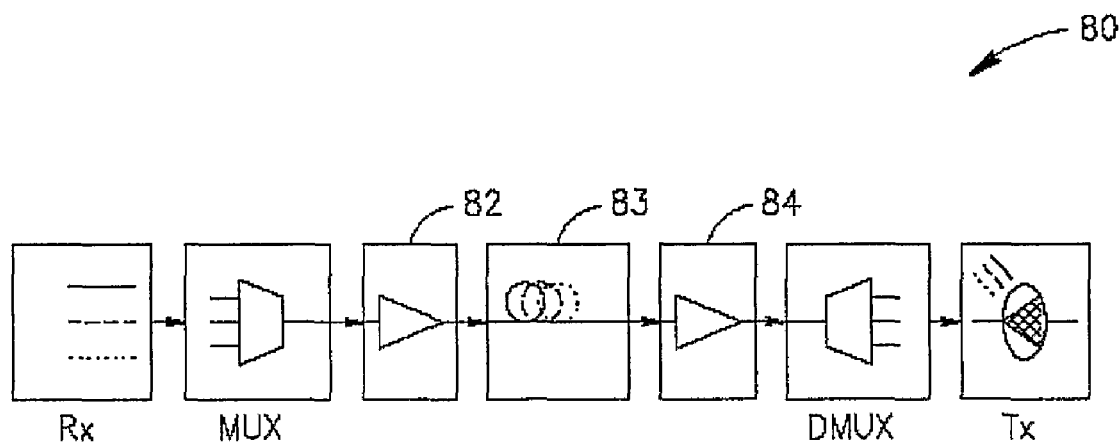
FIG. 6 schematically illustrates another optical link comprising an optical booster, which is to be replaced.

FIG. 6 illustrates an optical link 80 where multi-channel optical signals (of 40 channels) are transmitted through an optical fiber between a MUX and a DMUX, and amplified on their way by a booster (module 82) and an amplifier module 84. Static parameters of the network elements are stored in their ID tags, parameters of the fiber span are stored in the database of the network controller. For the booster and the amplifier these parameters are at least values of their exact gain and noise figure.

For example, the fiber span 83 between the booster 82 and the amplifier 84 is 140 km, its attenuation is 30 dB; the amplifier's gain is 29 dB. Suppose that owing to some reasons the booster 82 is to be replaced with another booster of the same type. As has been mentioned above, regular simulations are useless in predicting any changes in the system, since they may only process typical parameters known for the required type of elements (in this case, for the particular type of the booster).

In practice, when a module is replaced in an optical network, changes in the main parameters are expected due to the performance variation of different modules. The proposed technology of network simulation and control allows predicting and avoiding degradation of the system in its main parameters.

Figure 7:
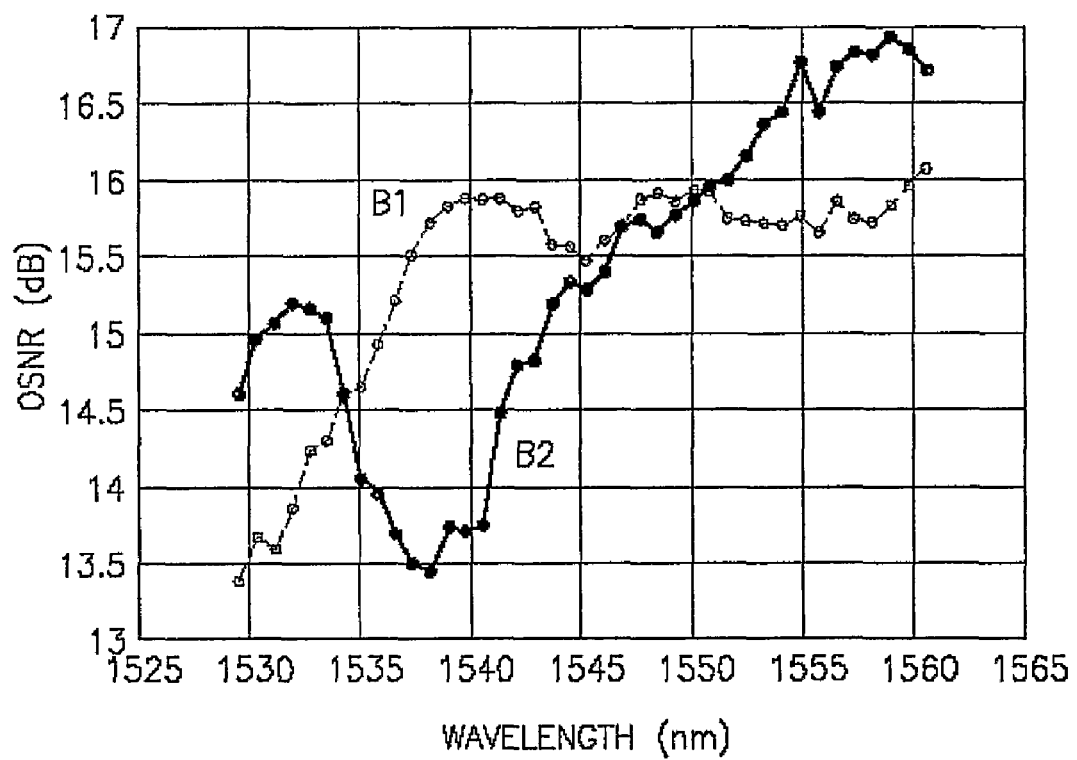
FIG. 7 schematically illustrates results of the proposed simulation of the optical link shown in FIG. 6, and simulation results of the same optical link where the optical booster is supposedly replaced by another booster of the same type but having different individual parameters.

FIG. 7 illustrates the simulated effect of replacing the Booster module with a specific different Booster of the same type, as have been obtained by the network simulator according to the proposed concept and using particular parameters of the link. Multiple channels of the link 80 are illustrated by circles located at particular levels of OSNR on vertical axes of the specified wavelengths. Line B1 demonstrates the situation before the supposed replacement, and B2 line—after the supposed replacement.

Let the minimal OSNR threshold be 15.5 dB. Suppose that the system practically utilizes only channels having wavelengths greater than 1540 nm. One can therefore notice that the supposed replacement will negatively affect all the channels between 1540 nm and 1547 nm.

The network simulator (and consequently the Network Management System) will most probably reject the requested change, possibly with issuance of some recommendations.

The recommendations that the management gives can be as follows: change the pre-emphasis configuration in the critical channels, use the critical channels for transmitting data at low bit rate, etc.

For recommending specific power values, which could be useful for pre-emphasis of the optical channels, the simulator may use specific known algorithms. Simulation of the network operation can be performed using known software means. However, it should be noted that any network simulators have previously been utilized only for off-line network simulation and with average typical parameters of network elements.

Figure 8:
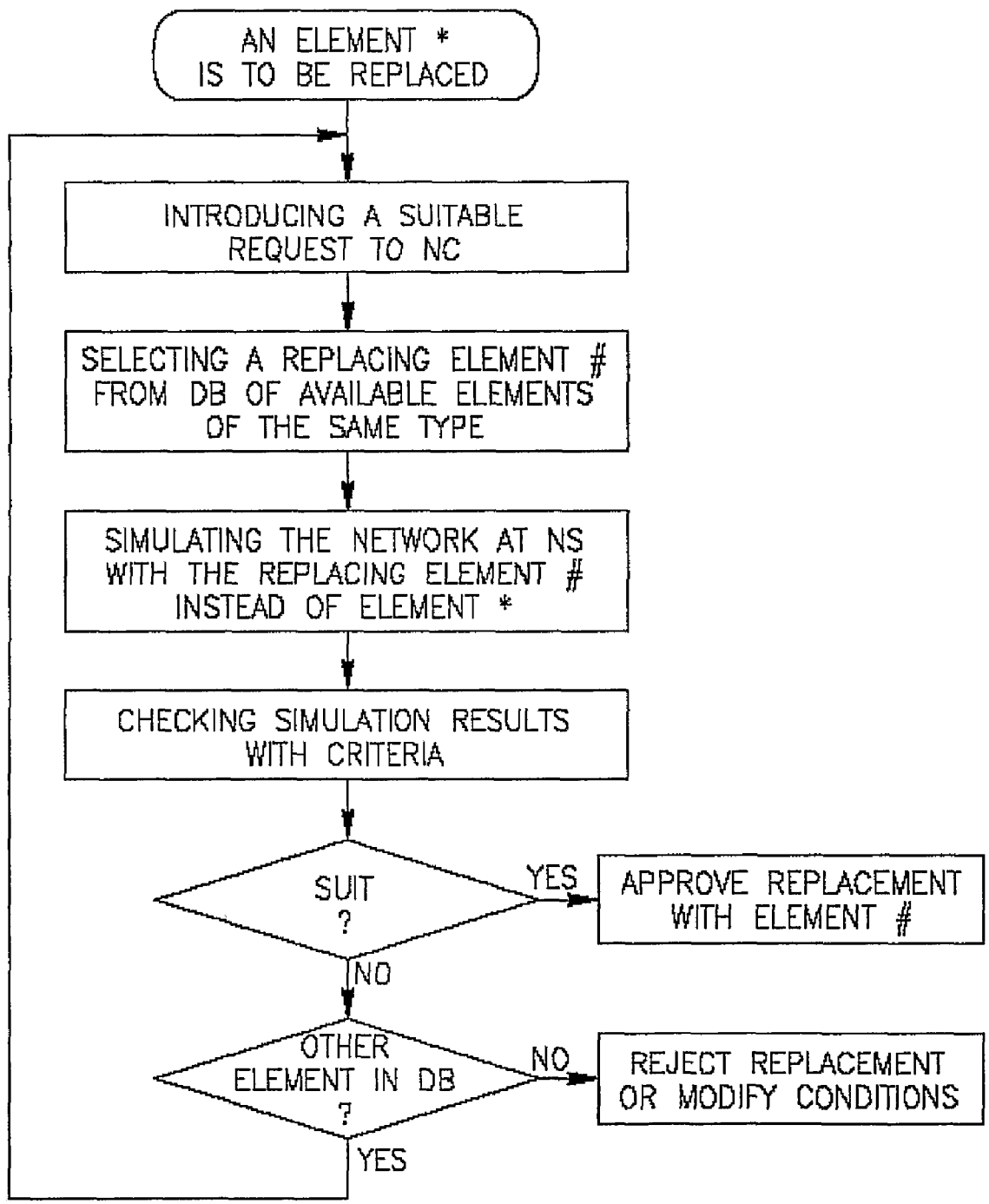
FIG. 8 is an exemplary flow chart showing how replacement of a network element can be simulated and performed in the proposed technology.

FIG. 8 illustrates a possible flow chart of the proposed technology for controlling a network in case when replacement of a network element (*) is required. The flow chart includes a step of scanning a specific database (stored in the network simulator or network controller), that comprises information on individual parameters of network elements available for replacement of similar ones installed in the network. (Alternatively, the algorithm may include scanning the ID tag of a specific element which is planned to replace an old network element). The step of scanning the database (or the specific element) enables the network controller (NC) to collect information on individual parameters of the replacing element(s) and to try using these parameters in the simulation instead of those of the element (*).

The flow chart shown in FIG. 8 may finally determine such a replacing element from the database, which has individual parameters satisfying the criteria of stability of the network, and then provide (say, the NMS) with approval of the replacement and indication of the specific replacing element. If no suitable replacing element is found, the simulator may issue instruction to either reject the replacement or recommend specific measures to improve consequences of such a replacement should it still be performed.

It should be appreciated that the inventive concept has been described and illustrated with the aid of non-limiting examples, and that other versions and implementations of the disclosed subjects of patent protection can be proposed and should be considered part of the invention being defined by the claims which follow.

The invention claimed is:

1. A method for controlling an optical network composed of network elements NEs, with the aid of a network controller NC being in communication with said network elements, the method comprising:

collecting, by the network controller NC, information on the network elements from said NEs, whenever a desired change in the network is requested by a Network Management System NMS, simulating, within the network controller, operation of the network with the requested change based on the collected information on the network elements, making, in the network controller, a decision on acceptability of the requested change, and if the decision is positive, causing implementation of the requested change in the network.

2. The method according to claim 1, further comprising:
preliminarily providing each particular network element NE with an individual ID tag comprising a memory storing information on individual parameters of said particular NE,
providing said ID tag with a capability of communicating with said NC and informing said NC about the individual parameters of the NE;
providing the NC with a capability of communicating with the ID tags of said NEs.

3. The method according to claim 1, wherein the step of simulating operation of the network comprises simulating operation of one or more network links forming the network.

4. The method according to claim 1, comprising informing the Network Management System NMS by said NC about the decision made in respect of the requested change and, if the decision is positive, implementing the required change with the aid of the NMS.

5. The method according to claim 1, further comprising producing recommendations of alternatives to the required changes, if the decision is negative.

6. The method according to claim 1, wherein said information on a particular network element NE comprises individual parameters of said NE including static parameters and dynamic parameters;
the static parameters comprise individual physical parameters of said particular network element;
the dynamic parameters comprise at least changeable working conditions of the particular NE.

7. A software product of a Network Simulator comprising computer implementable instructions and/or data for carrying out the method according to claim 1, said product being stored on a non-transitory carrier medium so that the software is capable of enabling operations of said method when used in a Network Controller.

8. The method according to claim 1, wherein said desired change in the network comprises at least one of the following: adding of optical channels, removing of optical channels, procedures of wavelength allocation.

9. A network controller NC for managing an optical network comprising a number of network elements NEs,
the controller being capable of communicating with the NEs for collecting information there-from;
said network controller NC comprising a network simulator NS, while the NS is capable of simulating operation of said network based on the collected information and data on a desired change in the network, said data being received from a Network Management System NMS:
said network controller NC being also adapted, based on the simulation results, to make a decision whether the desired change is acceptable, and to cause implementation of said change if the decision is positive.

10. The network controller according to claim 9, operative to inform the Network Management System in response to said decision.

11. The network controller NC according to claim 10, capable of
causing said NMS to implement the desired change if said decision is positive, and
producing and forwarding to said NMS recommendations alternative to the desired changes, if said decision is negative.

12. The network controller NC according to claim 9, wherein the network simulator NS is a software unit designed to reflect the optical network behavior by means of a mathematical simulation thereof taking into account said information comprising static and dynamic parameters of the network elements NE, as well as parameters of optical fiber spans connecting said NE; the NS being capable of predicting consequences of the desired change in the network, information on said consequences being the simulation results serving as basis for said decision.

13. The network controller according to claim 9, being a part of the Network Management System NMS.

14. A Network Management System comprising the network controller NC with the network simulator NS according to claim 9.

15. A network element NE for use as at least one of the number of network elements NEs according to claim 9, said network element equipped with an individual ID tag and comprising:
a memory block for storing individual parameters of the network element,
an interface block capable of communicating with a network controller NC and transmitting to it at least one of the parameters stored in the memory block.

16. The network element according to claim 15, wherein said individual parameters are entered by a manufacturer.

17. The network element NE according to claim 15, wherein said individual parameters stored in the memory block include one or more static parameters and one or more dynamic parameters.

18. The network element according to claim 17, further comprising one or more measuring circuits capable of measuring at least one of said dynamic parameters of the NE.

19. The network element according to claim 17, wherein the memory of the ID Tag comprises an industrially manufactured read only memory ROM for storing said static parameters of the network element and a random access memory RAM for storing said dynamic parameters of the network element.

20. The network element according to claim 15, further comprising a processor capable of processing and updating the parameters stored in the memory block.

21. The network element according to claim 15, wherein said static parameters comprise constant parameters of the NE to which the ID tag belongs.

22. An optical network comprising a number of network elements NE controllable with the aid of a network controller NC, each of the NE being provided with an individual ID tag capable of communicating with said NC and comprising a memory block for storing individual parameters of the network element NE;
the NC being capable of communicating with said NE for collecting information stored in their respective ID tags, and provided with a network simulator NS capable of simulating operation of the network using said information for a desired change in the network requested by a Network Management System NMS.

* * * * *